United States Patent [19]

Sivaram et al.

[11] Patent Number: 5,266,659

[45] Date of Patent: Nov. 30, 1993

[54] SOLID STATE PROCESS FOR THE PREPARATION OF HIGH MOLECULAR WEIGHT POLY(ARYLCARBONATE)S FROM AMORPHOUS OLIGOMER

[75] Inventors: Swaminathan Sivaram; Jagdish C. Sehra; Venkat S. Iyer; Koyalagunta Ravindranath, all of Pune, India

[73] Assignee: Council of Scientific & Industrial Research, New Delhi, India

[21] Appl. No.: 878,932

[22] Filed: May 5, 1992

[51] Int. Cl.$^5$ .............................................. C08G 64/40
[52] U.S. Cl. .................................... 525/463; 528/196; 528/199; 528/371
[58] Field of Search ............... 525/463; 528/371, 199, 528/196

[56] References Cited

U.S. PATENT DOCUMENTS 4,107,143  8/1978  Inata et al. ........................... 528/176
4,452,968  6/1984  Bolon et al. ........................... 528/271

FOREIGN PATENT DOCUMENTS 52-109591  9/1977  Japan .
55-98224   7/1980  Japan .
110376     4/1968  United Kingdom .
WO90/07536 9/1989  World Int. Prop. O. .

Primary Examiner—Harold D. Anderson
Attorney, Agent, or Firm—Pennie & Edmonds

[57] ABSTRACT

The invention disclosed is an improved process for the preparation of high molecular weight poly(arylcarbonate), the molecular weight ranging from 45,000–60,000 (corresponding to $n_{inh}$ 0.8 to 1.0) The process involves heating in a controlled manner, a BPA-polycarbonate oligomer in the presence of a catalyst selected from alkali metal aryl acid, alkali metal borohydrial and a quarternary ammonium salt of bioxiyanion derived from a carboxylic acid poly(arylcarbonate)s of high molecular weight produced by the process of present invention show enhanced crystallinity.

6 Claims, No Drawings

SOLID STATE PROCESS FOR THE PREPARATION OF HIGH MOLECULAR WEIGHT POLY(ARYLCARBONATE)S FROM AMORPHOUS OLIGOMER

BACKGROUND OF THE INVENTION

This invention relates to an improved process for the preparation of high molecular weight poly(arylcarbonate)s. The present invention more particularly relates to an improved process for the preparation of high molecular weight poly (arylcarbonate)s wherein the molecular weight is in the range of 45,000–60,000 (expressed as $n_{inh}=0.8$ to 1.0) and is increased in a post polymerisation reaction in the solid state. Poly(arylcarbonates)s of high molecular weight produced by the process of the present invention also show enhanced crystallinity.

These poly(arylcarbonate)s are the commercial engineering plastics produced by the industry for replacing glass and metals. Poly(arylcarbonate)s is processed by molding extrusion and film forming techniques for its conversion to different types of useful products such as safety helmets, motorcycle shields, bulletproof windows for cars and unbreakable baby bottles.

Poly(arylcarbonate)s have hitherto been produced by reacting bisphenol-A and phosgene, at an interface of methylene chloride/aqueous sodium hydroxide in presence of either amine or its salt as catalysts. The polymerisation is a two step process involving phosgenation of bisphenol A to its monochloroformate and the condensation of the latter with bisphenol-A hydroxyl groups for producing a polymer that remains dissolved in the organic phase. The overall stoichiometry may be represented as follows:

Amines or its salts act as catalyst for polycondensation. The polymer molecular weight is regulated by termination of the chain with the addition of monofunctional hydroxyl compounds such as phenol or t-butyl phenol. Different ratios of chain stoppers permit the preparation of different grades of polycarbonate corresponding to various molecular weight. However the known toxicity of phosgene and the problem associated with the formation of by-product sodium chloride from this reaction necessitated development of an improved process for the preparation of poly(arylcarbonate)s without the use of phosgene. These processes involve the carbonate interchange reaction of diarylcarbonate or dialkyl carbonate with Bisphenol-A or Bisphenol-A diacetate at elevated temperature 300°–320° C. in presence of suitable catalysts such as alkali and alkaline earth metals, organometallics etc. The molecular weight of poly(arylcarbonate)s is regulated by removal of byproduct (phenol from the former or methylacetate from the latter) which is facilitated by heat and vacuum reatment. Such processes have been discussed in British Patent No. 110,376 and U.S. Pat. No. 4,452,968.

The major disadvantage of the carbonate interchange process mentioned above is that interchange occurs in the melt resulting in the building up of high viscosity of the melt (approximately 6,000–10,000 poise at 250° C.). Removal of the volatile byproduct from such high viscosity of the melt, which is very essential for forming high molecular weight Poly(arylcarbonate)s is very difficult using conventional methods of reactor agitation. This limits the molecular weight produced by melt polycondensation process, to approximately 25,000 to 30,000 (expressed as $n_{inh}=0.4$ to 0.5). Such products though useful for moulding applications are unsuitable for extrusion applications which require higher molecular weights, in the range of 45,000–60,000 (expressed as $n_{inh}=0.8$ to 1.0).

The main object of the present invention is therefore to provide an improved process for the preparation of poly(arylcarbonate)s of substantially higher molecular weights ranging from 45,000–60,000 (expressed as $n_{inh}=0.8$ to 1.0) overcoming the drawbacks of the hitherto known processes. Accordingly, the present invention provides an improved process for the preparation of a high molecular weight poly(arylcarbonate)s, the molecular weight ranging from 45,000–60,000 (corresponding to $n_{inh}=0.8-1.0$) using a process employing controlled and programmed heating in the solid state in presence of suitable catalysts.

However, with respect to substantially amorphous aromatic polycarbonates derived from bisphenol-A, having a glass transition temperature (Tg) of 149°–150° C. it has been generally believed that solid state polymerization is infeasible. Such solid state polymerization techniques have been disclosed in the prior art for substantially more crystalline polymers, such as, poly(ethyleneterephthalate), nylon-66, etc. Aromatic copolyester carbonates, containing a crystallizable comonomer such as p-hydroxybenzoic acid (>50%) (Jap. Pat. 55-98224, U.S. Pat. No. 4,107,143) or hydroquinone (Jap. Pat. 52-109591) can also be subjected to the process of solid state polycondensation to increase molecular weights.

In the case of amorphous polycarbonates, derived only from bisphenol-A, prior art reports complex methods of inducing crystallization in prepolymers which can be subjected to solid state polymerization. For example, in PCT int. Appln. No. WO 90/07536, a process is described wherein an amorphous aromatic polycarbonate is treated with a solvent under sufficient shearing force to crystallize the prepolymer. Accordingly, an amorphous polycarbonate prepolymer having a number average molecular weight of about 4,000 is melted and extruded in a strand form at 240° C. through a die having orifices into a bath filled with acetone maintained at 40°–50° C. The bath is agitated at 1000 RPM and the extruded strand is drawn and stretched into a fibre. It is then subjected to shearing action to convert the strands of fibre to particles. The prepolymer, thus treated, is dried and subjected to heating at 220° C. under a flow of nitrogen whereby the number average molecular weight increases to 13,000.

On the contrary, the above referred patent application specifically states that an amorphous prepolymer dissolved in methylene chloride followed by solvent evaporation and drying does not show the desired increase in molecular weight upon solid state polymerization.

The above referred process is beset with the following drawbacks:

1. The process involves an additional step of crystallizing the polymer by extruding and precipitating the molten amorphous polymer into a bath of non solvent for the polymer such as acetone.

2. The process requires heating the polycarbonate prepolymer to a temperature of 240° C. Such thermal processing of unstabilized polycarbonates can lead to unwanted polymer degradation.

3. The hot molten polymer at a temperature of 240° C. is contacted with a low boiling non-solvent at 50° C.

This will lead to substantial volatilization of acetone which needs to be condensed for recycling/or disposal.

4. The prepolymer has to be subjected to extensive drying to remove volatile acetone.

5. Acetone is a low b.p./flash point organic solvent and operations described in 1-4 involve hazards of fire and explosion.

The drawbacks make the process described in Int. Pat. Appln. WO 90/07536 difficult to practice and require complex operations involving mechanical and rotating equipments.

SUMMARY OF THE INVENTION

In contrast to the prior art, we have now developed a substantially simpler process to effect solid state polymerization of an amorphous polycarbonate prepolymer. According to this process, a prepolymer in the number average molecular weight range of 5,000-10,000 can be subjected to programmed heating to predetermined temperatures in the presence of a catalyst. During this process, polymer undergoes progressive crystallization, thus rendering feasible the solid state polymerization process. The process herein described is essentially similar to that practiced for more crystalline polymers such as poly(ethyleneterephthalate), nylon-66, etc., which has hithertofore been considered infeasible for an amorphous polycarbonate based on bisphenol-A.

The process herein described thus obviates all the drawbacks of the prior art process. It uses no premelting operations or an hazardous solvent. No complex processing operations are required.

DESCRIPTION OF THE PREFERRED EMBODIMENTS

The amorphous prepolymer suitable for the process should have a $n_{inh}$ of 0.3-0.4 corresponding to molecular weights in the range of 14,000-20,000. A molecular weight of approximately 15,000 is considered optimum. Further more, the manner of dispersing the catalyst with the polymer is critical for obtaining the desired end result. The catalyst and the prepolymer is dissolved in a diluent which is a good solvent for the polymer followed by evaporation of the solvent. Following diluents are good solvents for the prepolymer: chloroform, tetrahydrofuran, methylene chloride, and the like. The preferred solvent is chloroform. Dissolution is effected at room temperature.

The oligo poly(arylcarbonate)s suitable as the starting material for the process of the present invention can be conveniently prepared by melt polycondensation process as described in our copending patent application is prepared by reaction of bisphenol-A with diaryl carbonate using bioxyanion catalyst derived from carboxylic acids or phenols, and quaternary ammonium hydroxide. These oligo poly(carbonate)s are characterised by an $n_{inh}$ in the range of 0.3 to 0.4 corresponding to molecular weights in the range of 14,000-20,000. Furthermore, the oligo poly(arylcarbonate)s have approximately 50% hydroxyl and 50% phenylcarbonate end groups which correspond to a number average degree of hydroxyl functionality of approximately one per mole of oligo poly(arylcarbonate)s. These oligo poly(arylcarbonate)s have a low melting point (218° C.), do not show any crystalline peak either in differential scanning calorimetry (DSC) X-ray diffraction (XRD) and are easily soluble in chloroform. Accordingly, the present invention provides an improved process for the preparation of high molecular weight poly(arylcarbo-nate)s, the molecular weight ranging from 45,000-60,000 (corresponding to $n_{inh}=0.8$ to 1.0) which comprises heating in a controlled manner a Bisphenol-A polycarbonate oligomer in the presence of a catalyst selected from alkali metal aryl oxide, alkali metal borohydride or a quaternary ammonium salt of bioxyanion derived from a carboxylic acid at a temperature in the range of 180° to 280° C. and at a pressure ranging from atmospheric to sub atmospheric pressure, in the solid state for a period ranging from 2 to 15 hrs.

The oligo poly(arylcarbonate)s described as above are dissolved in chloroform. A suitable catalyst is added into the chloroform solution of oligo poly(arylcarbonate)s and agitated well at room temperature. Thereafter the chloroform is evaporated to dryness and the polymer crushed and powdered. The powder is used for further processing.

The nature of catalyst can be alkali metal salts of Bisphenol-A alkali metal borohydrides or bioxyanion carboxylates and phenolates. The alkali metals can be chosen from lithium, sodium or potassium. The range of bioxyanions derived from carboxylic acids or phenols and quaternary ammonium hydroxide are similar to that described in our above said copending patent application is prepared by reaction of bisphenol-A with diaryl carbonate using bioxyanion catalyst derived from carboxylic acids or phenols, and quaternary ammonium hydroxide.

The amount of catalyst employed may be quite low and may range from $10^{-8}$ to $10^{-5}$ mole with reference to 1 mole of oligo poly(arylene carbonate).

The process of polymerisation of oligo poly(arylcarbonate)s is performed in the solid state at different pressures ranging from atmospheric pressure to sub atmospheric pressure. Generally 1 atm (760 mm Hg) is maintained during the initial phase and subsequently the pressure is reduced to a value in the range of 1.0 to 0.1 mm Hg vacuum or even lower. The temperature of the reaction is in the range of 180°-280° C. However the sample is heated in the solid state in a controlled and programmed manner, all the time ensuring that the polymer remains in the solid state. Reaction time is between 7-15 hrs, depending on the molecular weight range desired.

Optionally, the poly(arylcarbonate)s can be heated to the specified temperatures in a programmed manner, by using a hot inert gas such as nitrogen under reduced pressures.

By using an optimum time-temperature profile, it has been now possible to produce poly(arylcarbonate)s in the molecular weight range 45,000-60,000 (corresponding to $n_{inh}=0.8$ to 1.0). Any desired molecular weight can be achieved by adjusting the time-temperature profile. The polymers formed are colour free and show appreciable crystallinity as observed by the appearance of new crystalline melting peaks in DSC in the range 230-280. XRD of high molecular weight poly(arylcarbonate)s show sharp crystalline peaks in the 20 range of 17° corresponding to % crystallinity in the range of 30-50%.

The invention is illustrated by the examples given below which should not be however, construed to limit the scope of invention.

EXAMPLE 1

A Bisphenol-A polycarbonate oligomer (5 g, $n_{inh}$ in chloroform at 30° C.=0.33 dl/g, $M_n=6,425$) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer held at 210° C. for 2 hrs. Subsequently the polymer was cooled to room temperature. The resulting Bisphenol-A polycarbonate had a $n_{inh}$ of 0.47 dl/g at 30° C. in chloroform corresponding to a molecular weight of 24,000.

EXAMPLE 2

A Bisphenol-A polycarbonate oligomer (5 g, $n_{inh}$ in chloroform at 30° C. = 0.33 dl/g, $M_n$ = 6,425) was dissolved in 25 mL chloroform. Bisphenol-A-disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer held at 210° C. for 5 hrs. Subsequently the polymer was cooled to room temperature. The resulting Bisphenol-A polycarbonate had a $n_{inh}$ = 0.6 dl/g at 30° C. in chloroform corresponding to a molecular weight of 32,500.

EXAMPLE 3

A Bisphenol-A polycarbonate oligomer (5 g, $n_{inh}$ in chloroform at 30° C. = 0.33 dl/g, $M_n$ = 6,425) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reducet to 1 mm of Hg and the polymer was initially held at 210° C. for 4 hr and subsequently temperature was gradually raised to 230 C. the polymer was kept at 230° C. for additional 2 hr. The polymer was cooled to room temperature. The resulting Bisphenol-A polycarbonate had a $n_{inh}$ = 0.67 dl/g at 30° C. in chloroform corresponding to a molecular weight of 37,100.

EXAMPLE 4

A Bysphenol-A polycarbonate oligomer 85 g, $n_{i \sim h}$ in chloroform at 30° C. = 0.33 dl/g, $\overline{M}_n$ = 6,425) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer held at 200° C. for 4 hr and temperature gradually raised to 230° C. and maintained at 230° C. for additional 10 hrs. There after the polymer was cooled to room temperature. The resulting Bisphenol-A polycarbonate had a $n_{inh}$ = 0.81 dl/g at 30° C. in chloroform corresponding to a molecular weight of 46,900.

EXAMPLE 5

A Bisphenol-A polycarbonate oligomer (5 g, $n_{inh}$ in chloroform at 30° C. = 0.33 dl/g, $\overline{M}_n$ = 6,425) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer was initially held at 220° C. for 1 hr and subsequently temperature was gradually raised to 230° C. the polymer was kept at 230° C. for additional 1 hr. The polymer was cooled to room temperature. The resulting Bisphenol-A polycarbonate had a $n_{inh}$ = 0.52 dl/g at 30° C. in chloroform corresponding to a molecular weight of 27,300.

EXAMPLE 6

A Bisphenol-A polycarbonate oligomer (5 g, $n_{inh}$ in chloroform at 30° C. = 0.33 dl/g, $\overline{M}_n$ = 6,425) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer held for 1 hr each at 220° C., 230° C., 240° C.; 250° C. and 260° C. and thereafter the polymer was cooled to room temperature. The polymer obtained was slightly melted and was of brown coloured. The resulting Bisphenol-A polycarbonate had a $n_{inh}$ = 1.3 dl/g at 30° C. in chloroform corresponding to a molecular weight of 83,600.

EXAMPLE 7

A Bisphenol-A polycarbonate oligomer (5 g, $n_{inh}$ in chloroform at 30° C. = 0.33 dl/g, $\overline{M}_n$ = 6,425) was dissolved in 25 mL chloroform. Bisphenol-A disodium salt $(1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer was held for 1 hr each at 220° C., 230° C. and 240° C. and 2 hrs at 250° C. and 1 hr at 260° C. The polymer was cooled to room temperature. The resulting Bisphenol-A polycarbonate had a $n_{inh}$ = 0.97 dl/g at 30° C. in chloroform corresponding to a molecular weight of 58,500.

EXAMPLE 8

A Bisphenol-A polycarbonate oligomer (1 g, $n_{inh}$ in chloroform at 30° C. = 0.33 dl/g, $\overline{M}_n$ = 6,425) was dissolved in 25 mL chloroform. Bisphenol-A disodium salt $(5 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated to 210° C. under $N_2$ over a period of 1 hr. Thereafter the pressure was reduced to 1 mm of Hg and the polymer was held for 1 hr each at 210° C., for 4 hrs and kept at 230° C. for additional 5 hrs. The resulting Bisphenol-A polycarbonate was cooled to room temperature. The DSC showed melting endotherm at 287° C. and XRD gave sharp crystalline peak in the 2θ region 17° corresponding to % crystallinity in the range of 48-51.

EXAMPLE 9

A Bisphenol-A polycarbonate oligomer (5 g, $n_{inh}$ in chloroform at 30° C. =0.27 dl/h, $\overline{M}_n$=6,000) was dissolved in 25 mL chloroform. Bisphenol-A disodium salt ($1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated from room temperature to 220° C. under vacuum of <1 mm Hg over a period of 1 hr. Thereafter the polymer was held for 2 hr each at following temperatures: 200° C.; 230° C.; 240° C. and finally at 250° C. Thereafter the polymer was cooled to room temperature. The resulting Bisphenol-A polycarbonate had a $n_{inh}$=0.47 dl/g at 30° C. in chloroform corresponding to a molecular weight of 24,000.

EXAMPLE 10

A Bisphenol-A polycarbonate oligomer (5 g, $n_{inh}$ in chloroform at 30° C. =0.40 dl/g, $\overline{M}_n$=9,000) was dissolved in 25 mL chloroform. Bisphenol-A disodium salt ($1.25 \times 10^{-4}$ g) was added to this solution and stirred for 1 hr. Thereafter the chloroform was removed by distillation and the polymer dried in vacuum at 60° C. The polymer was mechanically crushed and particles passing through 22 mesh screen (<710 micron) was collected. 0.75 g of this polymer was heated from room temperature to 220° C. under vacuum of <1 mm Hg over a period of 1 hr. Thereafter the polymer was held for 2 hr each at following temperatures: 200° C.; 230° C.; 240° C. and finally at 250° C. There after the polymer was cooled to room temperature. The resulting Bisphenol-A polycarbonate had a $n_{inh}$=0.78 dl/g at 30° C. in chloroform corresponding to a molecular weight of 44,800.

The main advantages of the invention are:

Unlike hitherto known process which is performed in the melt, high molecular weight poly(arylcarbonate) s can be produced in the solid state without any need for complete operations such as premelting, solvent treatment, drying, etc. polymer melts have high viscosities, cannot be agitated easily to provide uniform heating and local overheating may cause the melt to degrade. On the contrary, the solid state reaction requires no agitation, and there is no danger of polymer degradation and consequently polymer with good colour is obtained. The process is simple, needs no mechanical, rotating equipments and poly(arylcarbonate)s of any range of molecular weights can be prepared for desired end applications (namely injection molding or extrusion) and can be simply obtained by suitably controlling the time-temperature profile. The poly(arylcarbonate)s prepared by this process show higher crystallinity than similar polymers produced by melt or interfacial processes.

We claim:

1. An improved process for the preparation of high molecular weight poly(arlyenecarbonate)s having a viscosity average molecular weight from 45,000–60,000 corresponding to $n_{inh}$=0.8 to 1.0 dl/g measured in chloroform at 30° C. which comprises heating in a controlled manner an amorphous Bisphenol-A polycarbonate oligomer in the solid state in the presence of a catalyst selected from alkali metal aryl oxide, alkali metal borohydride or a quaternary ammonium salt of bioxyanion derived from a carboxylic acid to a temperature of 210° C. for about 1–4 hrs at 760 mm of Hg, followed by heating to a temperature of 220°-260° C. over about 1–10 hours at a pressure of 1 mm of Hg.

2. The improved process as claimed in claim 1, wherein the oligomer of bisphenol-A polycarbonate is prepared by reaction of bisphenol-A with diaryl carbonate in the presence of a bioxyanion catalyst derived from carboxylic acids or phenols, and quaternary ammonium hydroxide.

3. The improved process as claimed in claim 1, wherein the oligo poly(arylenecarbonate) is characterized by an $n_{inh}$ of 0.3 to 0.4 dl/g measured in chloroform at 30° C. corresponding to a viscosity average molecular weight of 14,000 to 20,000.

4. The improved process as claimed in claim 1, wherein the oligo poly(arylenecarbonate)s have approximately 50% hydroxyl and 50% phenyl carbonate end groups which correspond to a number average degree of hydroxyl functionality of approximately one per mole of oligo poly(arylenecarbonate).

5. An improved process as claimed in claim 4 wherein the alkali metal in the catalyst is selected from lithium, sodium or potassium.

6. The improved process as claimed in claim 1 wherein the amount of the catalyst ranges from $10^{-8}$ to $10^{-5}$ mole with reference to 1 mole of oligo poly(arylenecarbonate).

* * * * *